United States Patent [19]
Bötsch et al.

[11] 3,933,715
[45] Jan. 20, 1976

[54] N-SUBSTITUTED MALEIC IMIDE PRESERVATIVE FOR AQUEOUS DISPERSIONS OF POLYMERS DERIVED FROM α, β-ETHYLENICALLY UNSATURATED MONOMERS

[75] Inventors: Franz Bötsch, Burgkirchen, Alz; Helmut Braun, Hofheim, Taunus; Walter Fink, Frankfurt am Main; Friedrich Heller, Burghausen; Karl Heinz Wallhäusser, Hofheim, Taunus, all of Germany

[73] Assignee: Hoechst Aktiengesellschaft, Frankfurt am Main, Germany

[22] Filed: Feb. 12, 1973

[21] Appl. No.: 331,856

[30] Foreign Application Priority Data
Feb. 16, 1972 Germany............... 2207199

[52] U.S. Cl. ..... 260/29.6 MN; 260/326.5; 424/274; 117/161 UZ; 260/45.8 N; 252/380; 260/17 R; 260/29.6 HN; 260/29.6 N; 260/29.7 N; 260/42.44; 260/42.55

[51] Int. Cl.² ............... C08L 25/14; C08L 35/06; C09D 5/14
[58] Field of Search........... 260/29.6 MN, 29.6 HN, 29.6 N, 260/29.7 N

[56] References Cited
UNITED STATES PATENTS

| | | | |
|---|---|---|---|
| 3,090,689 | 5/1963 | Tillet | 260/29.6 MN X |
| 3,093,656 | 6/1963 | Dreher et al. | 260/29.6 MN X |
| 3,098,002 | 7/1963 | Riddell et al. | 260/29.6 HN |
| 3,098,003 | 7/1963 | Riddell et al. | 260/29.6 HN |
| 3,407,204 | 10/1968 | Shay et al. | 260/29.6 HN |
| 3,544,588 | 12/1970 | Minieri | 260/29.6 HN |
| 3,756,991 | 9/1973 | Kühne et al. | 260/29.6 HN X |

FOREIGN PATENTS OR APPLICATIONS

| | | | |
|---|---|---|---|
| 1,077,956 | 8/1967 | United Kingdom | 260/29.6 HN |
| 1,174,514 | 12/1969 | United Kingdom | 260/326.5 |

Primary Examiner—Lucille M. Phynes
Attorney, Agent, or Firm—Curtis, Morris & Safford

[57] ABSTRACT

Preserved synthetic resin dispersions and products made therefrom are provided which contain N-substituted maleic imide derivatives as a preservative.

12 Claims, No Drawings

N-SUBSTITUTED MALEIC IMIDE PRESERVATIVE FOR AQUEOUS DISPERSIONS OF POLYMERS DERIVED FROM <, >-ETHYLENICALLY UNSATURATED MONOMERS

The present invention relates to preservatives on the basis of N-substituted maleic imide derivatives for aqueous dispersions, especially aqueous synthetic resin dispersions which are used for example as vehicle for paints, glues and adhesives, in the building field, for paper manufacture and finishing, for leather coating, textile finishing or soil consolidation, as well as for the finished products manufactured with the use of such dispersions.

Though aqueous synthetic dispersions are relatively resistant to micro-organisms, the preservation of these products has become increasingly important, since the amount of residual monomer present in the dispersions, which has a preserving effect to a certain extent, has been reduced to an increasing extent because of the disagreeable odor of the monomer.

Until now, there have been employed for preserving aqueous synthetic resin dispersions and finished products manufactured with the use of such dispersions, especially during their storage and transport, compounds of the following classes: organo-mercury compounds, phenol and phenol derivatives, chlorophenols and chlorophenolates, dimethyl-dithiocarbamates, mercapto-benzothiazoles, substances yielding formaldehyde, p-hydroxybenzoates, alkali metal propionates, organo-tin compounds or quaternary ammonium salts.

Despite this wide range of biocidally active substances, efforts continue to be made to obtain new preservatives for the following reasons:

1. On prolonged action of the same substance, very often resistant germs develop in micro-organisms, and effective protection against these resistant strains is then only ensured by a substance belonging to another class of compounds.
2. Preservatives should have a biocidal activity as efficient as possible while having simultaneously the least possible toxicity in mammals. The range of their effect should be as wide as possible and their activity practically independent of the pH of the medium. These requirements are insufficiently met by quite a number of the above classes of substances.
3. The addition of a preservative to aqueous synthetic resin dispersions must not adversely affect the technological properties. Thus, for example, dispersions containing anionic emulsifiers should not be preserved by quaternary ammonium compounds, since these substances may have a negative effect on the stabilizing activity of the emulsifier. Anyway, nitrogen or sulfur containing substances are undesirable in aqueous synthetic resin dispersions, since they often accentuate the tendency of dispersions and paint films made therefrom to turn yellow.

British Pat. No. 1 174 514 hints at the fungicidal properties of N-maleic imide derivatives, but it cannot be learned from this patent specification that this class of substances may be used successfully for combating micro-organisms in aqueous dispersions without causing a yellowing of the films.

It has now been found that, surprisingly, aqueous synthetic resin dispersions and finished products manufactured with the use thereof can be preserved in an especially efficient manner by adding to these dispersions from 0.05 to 1.0 weight %, preferably from 0.1 to 0.5 weight %, relative to the dispersion, of at least one N-substituted maleic imide derivative of the formula

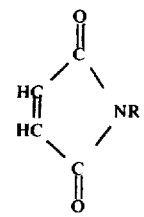

where R is an alkyl, cycloalkyl or aryl radical having from 3 to 8 carbon atoms, a 2-chloroethyl radical, a 4-nitrophenyl radical or a 2-naphthyl radical. Preferred substances are the N-n-butyl, N-neopentyl, N-cyclopentyl, N-(3,3'-dimethyl-butyl), N-benzyl, N-(2-chloroethyl), N-phenyl or N-(4-nitrophenyl) derivatives which have a good activity as well as a wide activity range. Especially advantageous are the N-neopentyl, N-benzyl and N-phenyl derivatives.

Suitable aqueous synthetic resin dispersions which may be preserved in accordance with the present invention are in principle all polymer dispersions prepared by polymerization or copolymerization of α,β-ethylenically unsaturated compounds in the aqueous phase, optionally in the presence of emulsifiers and/or protective colloids and catalysts or redox systems yielding free radicals, or by other preparation processes. The aqueous synthetic resin dispersions may be prepared on the basis of the following α,β-ethylenically unsaturated compounds which may be either homopolymerized or copolymerized with each other in a suitable manner:

Acrylic acid alkyl esters having from 1 to 18 carbon atoms in the alkyl radical, for example methylacrylate, ethylacrylate, butylacrylate, 2-ethyl-hexylacrylate, laurylacrylate, stearyl-acrylate and the like, methacrylic acid alkyl esters having from 1 to 18 carbon atoms in the alkyl radical, for example methylmethacrylate, ethyl-methacrylate, butylmethacrylate, 2-ethyl-hexylmethacrylate, stearylmethacrylate and the like, vinyl esters, for example vinyl formate, vinyl acetate, vinyl propionate, vinyl butyrate, vinyl versatate, vinyl laurate, vinyl oleate, vinyl stearate and the like, esters and semi-esters of maleic acid or fumaric acid which may be derived for example from the alcohols methanol, ethanol, (iso-) butanol, (iso-) octanol and the like, vinyl and vinylidene halides, for example vinyl chloride, vinylidene chloride, chloroprene and the like, vinyl aromatics, for example styrene, vinyltoluene, divinylbenzene and the like, nitriles, for example acrylonitrile, methacrylonitrile and the like, hydrocarbons, for example ethylene, propylene, (iso-)butylene, butadiene, isoprene and the like, α,β-ethylenically unsaturated acids, for example acrylic acid, methacrylic acid, crotonic acid and the like, amides of α,β-ethylenically unsaturated acids, for example acrylamide, methacrylamide, methylolacrylamide and the like, as well as other monomers usually employed for the preparation of dispersions.

The dispersions or the finished products manufactured therefrom may contain plasticizers, defoamers, antifreeze agents, corrosion inhibitors, cross-linking agents and other substances in the amounts usually employed.

It is often advantageous to use a mixture of two or more different N-maleic imide derivatives as preservative, in order to obtain a synergistic effect.

The preservative is advantageously added immediately after the dispersion is prepared, but it is also possible to add it at any later time. Agitation or any other mixing process ensures a homogeneous distribution of the preservative in the dispersion.

The preservation of aqueous synthetic resin dispersions by means of N-substituted maleic imide derivatives, besides adding a further class of substances to the range of preservatives presents the following advantages:

Having a good anti-microbic activity — some N-substituted maleic imide derivatives have a biocidal activity which attains nearly that of organo-mercury compounds — the N-substituted maleic imide derivatives, as compared to organo-mercury or organo-tin compounds, have a low toxicity in mammals. The activity range of the most active of these derivatives is very widespread and includes bacteria, fungi and algae. In view of the often occuring resistance of certain micro-organism strains, this further preservative which now is available is very advantageous.

There is no adverse effect on the technological properties of the dispersions or of the finished products manufactured therefrom when the dispersions are preserved according to the invention by means of N-substituted maleic imide derivatives. Especially paint films of dispersion paints which have been preserved in accordance with the present invention do not tend to yellow despite the presence of the nitrogen containing preservative.

The following examples illustrate the invention.

In order to test the activity of the N-substituted maleic imide derivatives, different amounts of active substances, in certain cases also mixtures of such substances, were added to synthetic resin dispersions and a dispersion paint, and the substances were homogeneously distributed in the dispersions or dispersion paint by agitation. A blank which did not contain any active substance was used for a comparison.

About $10^6$ cells/ml each of the micro-organisms Staphylococcus aureus, representing gram-positive bacteria, and Escherichia coli, representing gram-negative bacteria, and Aspergillus niger and Candida albicans, representing the fungi, were added to the dispersions or paint and homogeneously distributed by agitation. Besides, some of the test dispersions had been infested by foreign germs during their storage. After 30 minutes (first control) and after 14 days, in some cases also after 28 to 30 days, samples were taken from the infested dispersions and their germ number was determined according to the plate method of Koch.

The results are listed in the following Examples 1 to 5. In Example 6, the yellowing of a preserved dispersion paint was examined.

EXAMPLE 1

The sample was a copolymer dispersion on the basis of styrene/butyl acrylate prepared in the presence of non-ionic and anionic emulsifiers and ammonium-peroxydisulfate and sodium disulfite (pH 7.4). The microbicidal activity after 14 days is indicated in the following Table:

| Active substance added | Staph. aureus | Escher. coli | Asperg. niger | Candida albicans |
|---|---|---|---|---|
| without addition of active substance | $10^6$ | $10^6$ | $10^5$ | $10^4$ |
| 0.1 % neopentyl-m. | $10^6$ | $10^6$ | <100 | <100 |
| 0.2 % neopentyl-m. | $10^6$ | $10^6$ | <100 | <100 |
| 0.5 % neopentyl-m. | <100 | <100 | <100 | <100 |
| 0.2 % phenyl-m. | <100 | <100 | <100 | <100 |
| 0.1 % neopentyl-m.+ 0.1 % phenyl-m | <100 | <100 | <100 | <100 |

EXAMPLE 2

The sample was a dispersion paint obtained from the dispersion described in Example 1 and an aqueous pigment paste containing hydroxy-ethyl cellulose besides titanium dioxide and calcium carbonate (pH 8.0). The following Table shows the microbicidal activity after 14 days.

| Active substance added | Staph. aureus | Escher. coli | Asperg. niger | Candida albicans |
|---|---|---|---|---|
| without addition | $10^6$ | $10^6$ | <100 | <100 |
| 0.1 % neopentyl-m. | $10^6$ | $10^6$ | <100 | <100 |
| 0.2 % neopentyl-m. | $10^5$ | $10^5$ | <100 | <100 |
| 0.5 % neopentyl-m. | <100 | <100 | <100 | <100 |
| 0.2 % benzyl-m. | $10^6$ | $10^6$ | <100 | <100 |
| 0.1 % phen. + 0.1 % benzyl | <100 | <100 | <100 | <100 |

EXAMPLE 3

The sample was a copolymer dispersion on the basis of ethylacrylate/methylmethacrylate prepared in the presence of ionic and non-ionic emulsifiers and potassium peroxy-disulfate (pH 9.7). The following Table shows the microbicidal activity after 14 days.

| Active substance added | | Staph. aureus | Escher. coli | Asperg. niger | Candida albicans |
|---|---|---|---|---|---|
| without addition | | $10^6$ | $10^6$ | <100 | <100 |
| 0.1 % | neopentyl-m | <100 | <100 | <100 | <100 |
| 0.2 % | neopentyl-m. | <100 | <100 | <100 | <100 |
| 0.5 % | neopentyl-m. | <100 | <100 | <100 | <100 |
| 0.2 % | phenyl-maleic imide | $10^6$ | $10^6$ | <100 | <100 |

-continued

| Active substance added | Staph. aureus | Escher. coli | Asperg. niger | Candida albicans |
|---|---|---|---|---|
| 0.1 % neopentyl-m. + 0.1 % benzyl-maleic imide | <100 | <100 | <100 | <100 |

EXAMPLE 4

The sample was a copolymer dispersion on the basis of butyl acrylate/methylmethacrylate prepared in the presence of anionic emulsifiers and ammonium peroxydisulfate (pH 8.8). The following Table shows the microbicidal activity after 14 days.

| Active substance added | Staph. aureus | Escher. coli | Asperg. niger | Candida albicans |
|---|---|---|---|---|
| without addition | $10^6$ | $10^6$ | <100 | <100 |
| 0.1 % neopentyl-m. | abt.200 | abt.200 | <100 | <100 |
| 0.2 % neopentyl-m. | <100 | <100 | <100 | <100 |
| 0.5 % neopentyl-m. | <100 | <100 | <100 | <100 |
| 0.2 % benzyl maleic imide | <100 | <100 | <100 | <100 |
| 0.1 % neopentyl-m. + 0.1 % benzyl-maleic imide | <100 | <100 | <100 | <100 |

EXAMPLE 5

The sample was a copolymer dispersion on the basis of vinyl acetate/ethylene prepared in the presence of non-ionic and anionic emulsifiers, polyvinyl alcohol, ammonium peroxy-disulfate and sodium disulfite (pH 6.7). The dispersion was heavily infested with foreign germs because of a storage of several months. The following Table shows the microbicidal activity after 14 days.

| Active substance added | Staph. aureus | Escher. coli | Asperg. niger | Candida albicans | Foreign germs |
|---|---|---|---|---|---|
| without addition | $10^6$ | $10^6$ | $10^5$ | $10^6$ | abt. $10^6$ |
| 0.1 % neopentyl-m. | $10^6$ | $10^6$ | <100 | $10^6$ | abt. $10^6$ |
| 0.2 % neopentyl-m. | $10^4$ | $10^4$ | <100 | <100 | $10^4$ |
| 0.5 % neopentyl-m. | $10^4$ | $10^4$ | <100 | abt. 100 | $10^3$ |
| 0.1 % phenyl-m. + 0.1 % benzyl-m. | $10^3$ | $10^3$ | <100 | <100 | $10^3$ |

The same samples were stored for a further 2 weeks and again examined. The following Table shows the microbicidal activity after 30 days.

| Active substance added | Staph. aureus | Escher. coli | Asperg. niger | Candida albicans | Foreign germs |
|---|---|---|---|---|---|
| without addition | $10^6$ | $10^6$ | $10^5$ | $10^6$ | $10^6$ |
| 0.1 % neopentyl-m. | $10^6$ | $10^6$ | <100 | $10^6$ | $10^6$ |
| 0.2 % neopentyl-m. | $10^5$ | $10^5$ | <100 | <100 | $10^4$ |
| 0.5 % neopentyl-m. | abt. 100 | abt. 100 | <100 | <100 | <100 |
| 0.1 % phenyl-m. + 0.1 % benzyl-m. | $10^3$ | $10^3$ | <100 | <100 | <100 |

EXAMPLE 6

The sample was a dispersion paint as described in Example 2. Three paint films, one (a) without addition of microbicidal agent, one (b) containing 0.5 %, relative to the total amount of paint, of neopentyl-maleic imide, and the third, (c) containing 0.5 %, relative to the total amount of paint, of benzo-isothiazolone, were prepared and irradiated for three days by means of a 300 Watt UV lamp. While the sample containing neopentyl-maleic imide and the paint film without any such addition did not turn yellow at all, the sample containing benzo-isothiazolone had substantially yellowed with the irradiation.

What is claimed is:

1. A preserved aqueous synthetic resin dispersion which comprises a polymer or copolymer of α,β-ethylenically unsaturated monomers and from 0.05 to 1.0 weight %, relative to the dispersion, of at least one N-substituted maleic imide derivative of the formula (I)

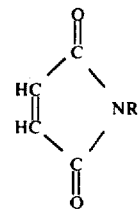

where R is an alkyl, cycloalkyl or aryl radical having from 3 to 8 carbon atoms, a 2-chloroethyl radical, a 4-nitrophenyl radical or a 2-naphthyl radical.

2. Preserved finished products based on aqueous synthetic resin dispersions, which comprise a polymer or copolymer of α,β-ethylenically unsaturated monomers and from 0.05 to 1.0 weight %, relative to the amount of dispersion, of at least one N-substituted maleic imide derivative of formula (I)

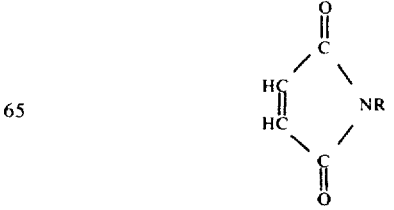

where R is an alkyl, cycloalkyl or aryl radical having from 3 to 8 carbon atoms, a 2-chloroethyl radical, a 4-nitrophenyl radical or a 2-naphthyl radical.

3. A process for the preservation of aqueous dispersions of polymers or copolymers of α,β-ethylenically unsaturated monomers or finished products manufactured therefrom which comprises adding to the dispersion or the finished product at least one N-substituted maleic imide derivative of formula (I)

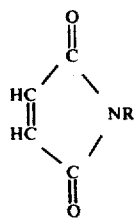

where R is an alkyl, cycloalkyl or aryl radical having from 3 to 8 carbon atoms, a 2-chloroethyl radical, a 4-nitrophenyl radical or a 2-naphthyl radical.

4. A preserved aqueous synthetic resin dispersion which comprises a polymer or copolymer of α,β-ethylenically unsaturated monomers and from 0.05 to 1.0 weight %, relative to the dispersion, of N-phenyl-, N-benzyl-, or N-neopentylmaleic imide or of a mixture thereof.

5. Preserved finished products on the basis of aqueous synthetic resin dispersions which comprise a polymer or copolymer of α,β-ethylenically unsaturated monomers and from 0.05 to 1.0 weight %, relative to the dispersion, of N-phenyl-, N-benzyl-, or N-neopentyl-maleic imide or of a mixture thereof.

6. A process for the preservation of aqueous dispersions of a polymer or copolymer of α,β-ethylenically unsaturated monomers or finished products manufactured therefrom which comprises adding at least one compound selected from the group consisting of N-phenyl-, N-benzyl- and N-neopentyl-maleic imide to the dispersions or the finished product.

7. A dispersion as defined in claim 1 wherein the imide derivative is N-neopentyl maleic imide.

8. A preserved finished product as defined in claim 2 wherein the imide derivative is N-neopentyl maleic imide.

9. A process as defined in claim 3 wherein the imide derivative is N-neopentyl maleic imide.

10. A preserved aqueous synthetic resin dispersion comprising an aqueous dispersion of a copolymer of styrene and butylacrylate and from 0.05 to 1.0 weight %, based on the weight of said dispersion, of N-neopentyl maleic imide as a preservative.

11. A preserved finished product made from the aqueous synthetic resin dispersion of claim 10.

12. A process for the preservation of aqueous synthetic resin dispersions or finished products made therefrom which comprises adding to an aqueous dispersion of a copolymer of styrene and butylacrylate or a finished product made from said dispersion an N-substituted maleic imide which is N-neopentyl maleic imide.

* * * * *